Figure 1:
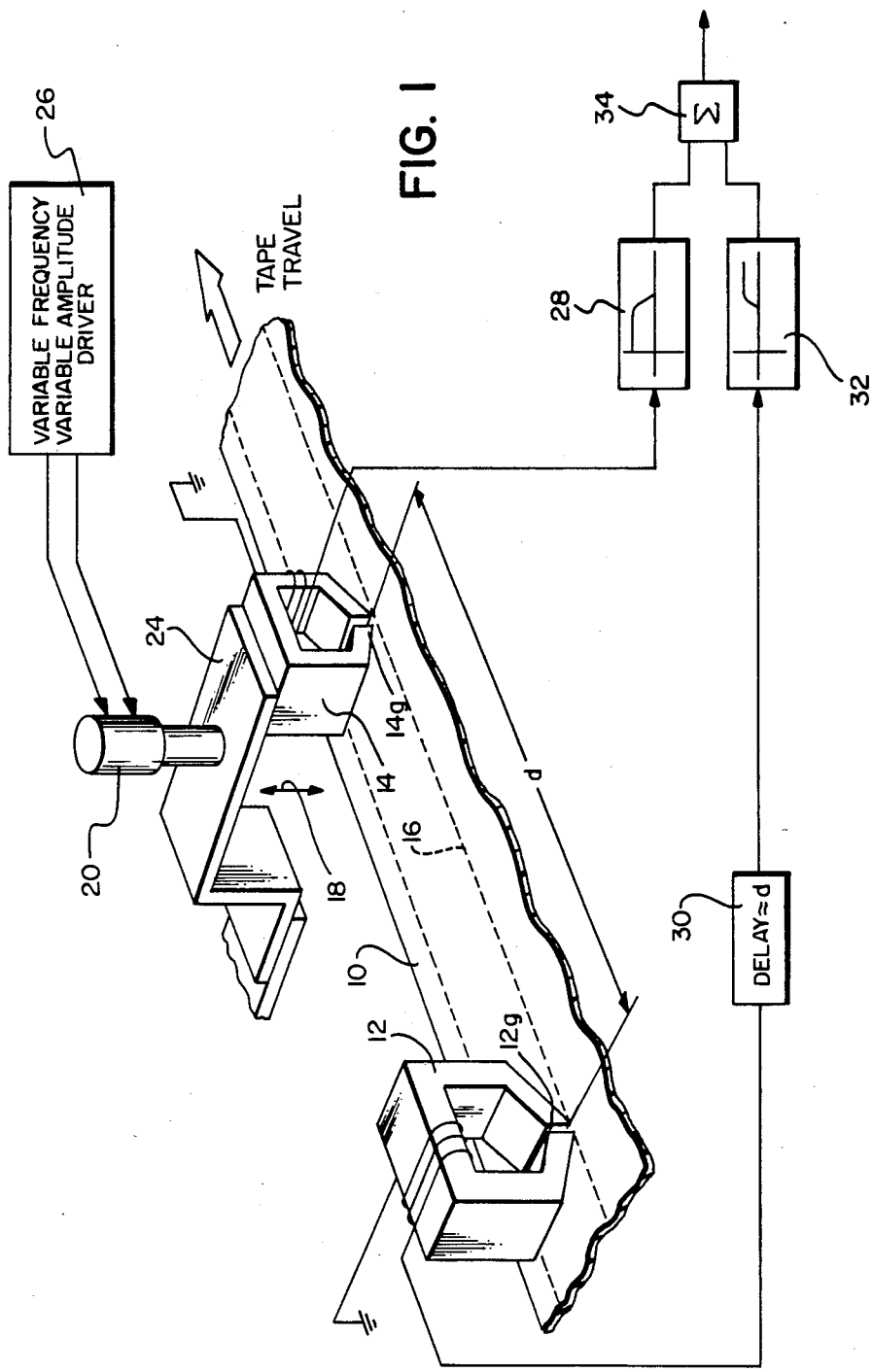

United States Patent [19]

French

[11] Patent Number: 4,796,111
[45] Date of Patent: Jan. 3, 1989

[54] MODULATING HEAD TAPE DISTANCE WITH VIBRATORY MOTION

[75] Inventor: William W. French, Cardiff-by-the Sea, Calif.

[73] Assignee: Eastman Kodak Company, Rochester, N.Y.

[21] Appl. No.: 25,686

[22] Filed: Mar. 13, 1987

[51] Int. Cl.$^4$ ............................ G11B 5/35; G11B 5/02
[52] U.S. Cl. ........................................ 360/55; 360/83
[58] Field of Search ................. 360/104, 107, 108, 22, 360/82, 83, 55, 24

[56] References Cited

U.S. PATENT DOCUMENTS

| | | | |
|---|---|---|---|
| 2,681,387 | 6/1954 | Roys | 360/110 |
| 3,070,670 | 12/1962 | Eldridge et al. | 360/24 |
| 3,456,249 | 7/1969 | Pear | 360/83 |
| 3,688,054 | 8/1972 | Suzuki | 179/100.2 RE |
| 3,728,699 | 4/1973 | Sordello | 340/174.1 C |

FOREIGN PATENT DOCUMENTS 53159750 6/1980 Japan .................................. 360/24

*Primary Examiner*—Raymond F. Cardillo
*Assistant Examiner*—Kevin Fournier
*Attorney, Agent, or Firm*—Robert F. Cody

[57] ABSTRACT

The invention in one embodiment thereof employs separate and respective heads for disparate signal frequency bands. One head is kept in intimate contact with the recording medium to maximize the response to the higher frequency signal band; and the other head is vibrated relative to the surface of the recording medium, thereby to augment $$(d\phi/dt),$$

and to improve the playback response to the lower frequency signal band. Since the two heads cannot reside physically at the same location, a suitable delay device is employed to bring the signals from the two heads into proper timed relationship, the outputs of the two heads being appropriately band-passed to reconstruct a complex signal composed of the two signal bands.

2 Claims, 2 Drawing Sheets

MODULATING HEAD TAPE DISTANCE WITH VIBRATORY MOTION

BACKGROUND OF THE INVENTION

1. Field of the Invention

This invention relates in general to magnetic recording systems and in particular to a recording system in which optimal recording of a wide spectrum of recorded frequencies is achieved.

2. Description Relative to the Prior Art

Conventional magnetic playback heads are sensitive to the time rate of change of recorded signal flux, i.e.

$$(d\phi/dt).$$

This would suggest, therefore, that higher recorded signal frequencies, which are characterized by maximized $$(d\phi/dt),$$

are easier to recover than lower frequency recorded signals. Notwithstanding this suggestion though, higher frequency signals are subject to the counter-influencing playback phenomenon often referred to as "spacing loss". Spacing loss (S.L.) in decibels, as is known, varies in accordance with the following emperical expression $$S.L. = 55(d/\lambda),$$

where d is head-to-medium spacing, and $\lambda$ is recorded wavelength; and, as will be appreciated, and in view thereof, those practicing the art of magnetic recording have long recognized the compelling need to provide (ordinarily) intimate contact between a playback head and a recording medium, the higher frequency recorded signals residing close to the surface of the recording medium where flux associated with such signals can easily close on itself.

Since spacing loss is inversely related to the wavelength of a recorded signal, its influence is barely felt in the playback of low frequency signals from a magnetic recording medium, such signals residing deep within the recording medium and relatively far from the medium's head contacting surface. Notwithstanding a low spacing loss manifestation for low frequency signals, however, such signals are intrinsically characterized by low rate of change of magnetic flux, and attendantly are not efficient in the production of good playback response.

Complex signals are typically composed of both high and low frequency signal commponents: Thus, at any given point along, say, the longitudinal axis of a magnetic tape, recorded flux patterns associated with both high and low frequency components may exist, the high frequency signal flux patterns residing at or near the surface of the tape, and the low frequency flux patterns residing beneath the high frequency flux patterns deeper within the cross-section of the tape. As a result, even with an excellent head-to-medium interface, playback of the lower frequency signal components may be less than would otherwise be desired.

SUMMARY OF THE INVENTION

To reconcile the disparate and anomalous requirements for efficient playback of bands of both high as well as of low frequency recorded signals, the invention employs separate and respective heads for such signal bands. In one embodiment of the invention, whereas one head is kept in intimate contact with the recording medium to maximize the response to the high frequency signal band, the other head is vibrated relative to the surface of the recording medium, thereby to augment $$(d\phi/dt),$$

and to improve the playback response to the lower frequency signal band. Since the two heads cannot reside physically at the same location, a suitable delay device is employed to bring the signals from the two heads into proper timed relationship, the outputs of the two heads being appropriately band-passed to reconstruct the complex signal composed of the two signal bands.

The invention will now be described with reference to the figures wherein

Figure 1A:
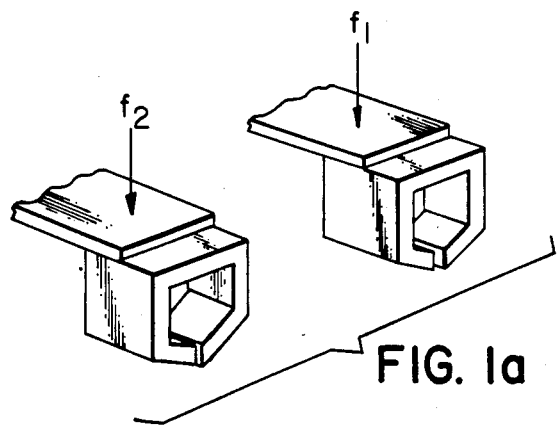
Figure 2:
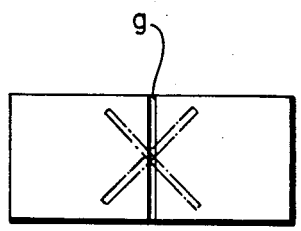

FIG. 1 is a schematic block diagram illustrating one embodiment of the invention, FIG. 1a depicts an alternative embodiment of the invention; and FIG. 2 is a schematic view useful in describing another embodiment of the invention.

Referring now to FIG. 1, a magnetic recording tape 10 is adapted to move in the indicated direction relative to first and second signal playback heads 12, 14. The playback heads 12, 14 are so positioned that they cooperate with the same information bearing recording track 16, and are spaced apart along the track 16 by a distance d. The transducer gap 12g of the head 12 may be optimized to recover short wavelength signals from the recording track 16, and the transducer gap 14g may be optimized to recover long wavelength signals from the recording track 16. Typically, the gap 12g would be shorter than the gap 14g.

The playback head 12, in this embodiment of the invention, is adapted to remain in intimate contact with the tape 10 so as to minimize the playback "spacing loss" of short wavelength signals pursuant to the aforesaid emperical expression. Notwithstanding the requirement for the head 12 to be in intimate contact with the tape 10, however, the playback head 14 is adapted to be vibrated to-and-fro vis-a-vis the tape, as indicated by the arrow 18. Needless to say, such cyclical variation of the head-to-tape spacing for the head 14 cyclically influences the head 14 output, albeit that such influence is more than compensated for by a significant increase in $$(d\phi/dt)$$

brought about by the vibration.

Vibration of the head 14 is effected by means of a solenoid device 20 coupled to a cantilever 24 supporting the head 14. The solenoid 20 is operated by a variable frequency/variable amplitude driver 26 (which may take any of a variety of forms), the driving frequency and amplitude thereof being selectable to optimize performance. Ideally, the frequency of vibration would be outside the band-pass of a low pass filter 28 (which will be referred to later), and as high as practical to maximize the $$(d\phi/dt)$$

effect.

Given the disparate locations for the playback heads 12, 14, a delay device 30 is employed to bring the output of the head 12 into proper timed relationship with the output of the head 14. Such being the case, the delayed output of the head 12 is high-pass filtered (32) to remove any low frequency signal components which would otherwise be available from the head 14. The output of the head 14, as indicated above, is low pass filtered: low pass filtering the output of the head 14, aside from filtering out the frequency associated with the head 14 vibration, has the additional effect of removing any recorded high frequency signal components which would otherwise be available from the head 12. (The cutoff frequencies of the filters 28, 32 are such that they complement each other and, thus, in effect provide a flat frequency response for the combination of filters.) A summing circuit 34 receives the outputs of the filters 28, 32 and combines such outputs into a complex resultant playback signal.

The invention has been described in detail with particular reference to a presently preferred embodiment, but it will be understood that variations and modifications can be effected within the spirit and scope of the invention. For example, it would be within the scope of the invention to vibrate both heads (FIG. 1a), each according to a respective frequency and amplitude depending on the bandwidth of frequencies to be recovered from the recording medium. Or, in a system employing only a single playback head, depending on the playback frequency, or frequencies, to be recovered, such single head could be vibrated. And, while FIG. 1 depicts the use of a head vibration that is to and fro the surface of a recording medium, other forms of head vibration are practicable as well. For example, FIG. 2 schematically depicts the vibration of a head so that the gap g thereof cyclically pivots about an axis perpendicular to the plane of the medium. Such a vibratory strategy, it will be appreciated, has the effect of enlarging the effective playback gap, depending on the amplitude of vibration; as a result, care must be employed in selecting the playback frequency range for which this embodiment of the invention would be employed.

What is claimed is:

1. Apparatus for playing back signal information recorded in the recording face of a magnetic medium, said apparatus comprising
    (a) a magnetic head of the type adapted to cooperate with said medium to produce therefrom an output signal representative of the rate of change of flux associated with a signal recorded in said medium, and
    (b) means for providing relative vibratory motion between said magnetic head and said medium to augment the rate of change of flux associated with said recorded signal, thereby to increase the efficacy of the playback of said signal information, said relative vibratory motion being vibratory turning about an axis that makes an angle with said recording face of said medium.

2. In apparatus for use in the playback of a signal recorded in the surface of a magnetic medium, said apparatus having a magnetic head for producing from said medium an output signal corresponding to the time rate of change of magnetic flux that is associated with said recorded signal, the improvement comprising
    means for providing relative oscillatory motion between said head and said medium, thereby to improve the playback of said recorded signal by augmenting the flux rate of change that is associated with said signal, said relative oscillatory motion being oscillatory turning about an axis that makes an angle with said recording surface of said medium.

* * * * *